(12) United States Patent
Boutin

(10) Patent No.: US 7,720,638 B2
(45) Date of Patent: May 18, 2010

(54) METHOD FOR DIAGNOSIS OF FUNCTIONAL FAULTS IN A FUNCTIONAL ARCHITECTURE

(75) Inventor: Samuel Boutin, Magny les Hameaux (FR)

(73) Assignee: Renault S.A.S., Boulogne Billancourt (FR)

(*) Notice: Subject to any disclaimer, the term of this patent is extended or adjusted under 35 U.S.C. 154(b) by 339 days.

(21) Appl. No.: 10/539,128

(22) PCT Filed: Dec. 19, 2003

(86) PCT No.: PCT/FR03/03851
§ 371 (c)(1), (2), (4) Date: Feb. 6, 2006

(87) PCT Pub. No.: WO2004/059407
PCT Pub. Date: Jul. 15, 2004

(65) Prior Publication Data
US 2006/0247872 A1    Nov. 2, 2006

(30) Foreign Application Priority Data
Dec. 20, 2002    (FR)    .................................. 02 16353

(51) Int. Cl.
*G06F 11/30* (2006.01)
(52) U.S. Cl. .................................................... 702/183
(58) Field of Classification Search ................... 702/183
See application file for complete search history.

(56) References Cited

U.S. PATENT DOCUMENTS

| | | | |
|---|---|---|---|
| 5,914,845 A * | 6/1999 | Chase | ........................ 361/111 |
| 5,939,625 A | 8/1999 | Torii et al. | |
| 5,951,619 A * | 9/1999 | Merl et al. | ................... 701/115 |
| 6,161,071 A * | 12/2000 | Shuman et al. | ................ 701/48 |
| 7,260,505 B2 * | 8/2007 | Felke et al. | .................. 702/187 |
| 2004/0133289 A1 * | 7/2004 | Larsson et al. | ................ 700/83 |
| 2004/0262990 A1 * | 12/2004 | Check et al. | ............. 303/113.1 |
| 2005/0038632 A1 | 2/2005 | Boutin et al. | |
| 2008/0216567 A1 * | 9/2008 | Breed | ........................ 73/146.5 |

FOREIGN PATENT DOCUMENTS

| | | |
|---|---|---|
| DE | 100 48 144 | 4/2002 |
| EP | 0 707 250 | 4/1996 |
| FR | 2 833 353 | 6/2003 |
| WO | 02/071360 | 9/2002 |

OTHER PUBLICATIONS

Merriam webster online dictionary definition of vehicle.*
U.S. Appl. No. 10/539,127, filed Jun. 16, 2005, Boutin.

* cited by examiner

*Primary Examiner*—Aditya Bhat
(74) *Attorney, Agent, or Firm*—Oblon, Spivak, McClelland, Maier & Neustadt, L.L.P.

(57) ABSTRACT

A method for diagnosis of functional faults in a functional architecture, including a unit of functions connected to electronic components, producing and using data, at least one datum of which can adopt a fixed pre-determined value, following occurrence of an erroneous functioning of at least one of the components of the unit. The method, while having a unit of functions and carrying out a function for which the input and output data can be assigned to sensors or actuators, determines particular values during which the particular values corresponding to functional faults for the sensors and actuators are listed and generates the functional diagnostic for the function as a function of the lists determined during the determining.

16 Claims, 2 Drawing Sheets

UCE = ELECTRONIC CONTROL UNIT

METHOD FOR DIAGNOSIS OF FUNCTIONAL FAULTS IN A FUNCTIONAL ARCHITECTURE

BACKGROUND OF THE INVENTION

1. Field of the Invention

The present invention relates to a method for diagnosing functional faults of a functional architecture. The said architecture may be composed of a set of functions associated with electronic components ($A''_i$; $C''_i$; $UCE_n$; B) that produce and consume data, at least one of the said data ($x_i$) being able to assume a predetermined particular value ($x_{ip}$) following the development of a functional fault of at least one of the components ($A''_i$; $C''_i$; $UCE_n$; B) of the said set.

2. Discussion of the Background

There are known assemblies of electronic systems of this type, designed in particular as equipment for motor vehicles. Such a vehicle is commonly provided with a plurality of systems, each ensuring the execution of a service such as control of the engine that powers the vehicle, the management of the passenger-compartment air conditioning, the management of the interactions of the vehicle with the ground (brakes, suspension, etc.) and the management of telephone communications.

The hardware components of the assembly of such systems, for a vehicle, for example, have been illustrated schematically in FIG. 1 of the attached drawing. These components comprise substantially electronic control units or "calculators" $UCE_m$, each calculator being connected if necessary to sensors $C''_i$ and to actuators $A'''_j$, all calculators being connected to at least one and the same bus B, on which they can send or receive information streams, which may be multiplexed, for example, originating from or destined for other calculators connected to bus B.

This multiplexing is achieved in particular, as is well known for the CAN bus, for example, by introducing the information streams in question into messages having the form of digital signal frames.

As an illustrative example, "engine control" system $S_2$ comprises calculator $UCE_2$, a plurality of sensors $C^2_i$ sensitive to variables such as the speed of the engine, which may be an internal combustion engine, for example, the pressure at the intake manifold of this engine, the outside air pressure, the temperature of the engine-cooling water, the air temperature and the battery charge level, as well as a plurality of actuators $A^2_j$. Calculator $UCE_2$ is duly programmed to execute a plurality of engine-control functions such as: regulation of idling speed, regulation of the richness of the air/fuel mixture, adjustment of the ignition advance of this mixture and recirculation of the exhaust gases. To accomplish this, calculator $UCE_2$ exploits the information streams arriving from the aforesaid sensors $C^2_i$ and creates control signals for actuators $A^2_j$, which are composed of an additional air control valve and a spark-plug ignition coil for the "idling-speed regulation" function, a fuel injector for the "richness regulator" function, the same ignition coil for the "ignition advance" function and a valve for the "recirculation of exhaust gases" function.

The other "services" cited in the foregoing, such as "passenger-compartment air conditioning" and "interaction with the ground" are executed by architecture systems analogous to that presented in the foregoing for engine control.

All these systems communicating on one and the same bus B comprise a multiplexed network. It is therefore conceivable that a plurality of functions associated with different systems can exploit information streams originating from the same sensors, for example, which avoids costly redundancies in the structure of the assembly of systems. The use of a multiplexed network also permits a very large reduction in the length of the electric lines interconnecting the different elements of the assembly. Such a multiplexed assembly also permits the mapping of non-traditional and possibly complex functions, sometimes involving a plurality of systems and for this reason known as "cross-functional". As an illustrative and non-limitative example, the detection of an "airbag deployed" information stream, meaning that the vehicle has suffered a collision, can then be processed in such a way that an emergency call is sent out by a mobile telephone device on board the vehicle.

Another step in the design of electronic systems is the analysis of functional safety, comprising identifying feared incidents such as a burst tire, a functional fault of a sensor essential to a critical function, a functional fault of an actuator, such as a brake actuator, in order to improve the safety and to specify reduced modes of operation if necessary.

It is noted that a safe functional system is a system that on the one hand diagnoses certain feared incidents in order to implement reduced modes of operation, and on the other hand is tolerant to undiagnosed feared incidents on the basis of the analysis of functional safety.

From French Patent Application No. 01-15819, filed by the Applicant and incorporated here by reference, there is known the notion of particular value and the use thereof in a method for diagnosing functional faults of an assembly of electronic systems.

However, this said method is applicable only to a given embodiment of a functional architecture, and it cannot be reused for another embodiment.

SUMMARY OF THE INVENTION

The Applicant has discovered that the particular values could be classified into categories in such a way that it is possible to separate particular values known as functional values, which are independent of the embodiment in the form of a hardware architecture, and particular values known as operational values, which are specific to the embodiment in the form of calculators, communication bus and cabling.

The Applicant has also discovered that the different categories of particular values were related, in that a particular value at the functional level leads to creation of particular values at the operational level. In the same way, starting from an operational analysis, it is possible to deduce a functional analysis, which can then be re-applied to other embodiments.

In this way, the problem cited in the foregoing can be resolved by a method for diagnosing functional faults of a functional architecture composed of a set of functions associated with electronic components ($A''_i$; $C''_i$; $UCE_n$; B) that produce and consume data, at least one of the said data ($x_i$) being able to assume a predetermined particular value ($x_{ip}$) following the development of a functional fault of at least one of the components ($A''_i$; $C''_i$; $UCE_n$; B) of the said set, this method being characterized in that, given a set of functions that performs a service, wherein the input and output data can be associated with sensors or actuators, it includes:

- a step of determination of particular values, in the course of which there are listed the particular values corresponding to functional faults of the sensors and actuators,
- a step of determination of propagation, in the course of which there are listed the particular values that permit propagation of the information stream relating to these defects across the said functions, a step of diagnosis, in the course of which there is formed the functional diagnosis of the said service as a function of the lists obtained from the determination steps, and a step of recording of the particular values and of their propagation on a memory device for a tool provided for validation of the said architecture.

In this way there is defined a functional diagnosis that is independent of the embodiment and that can therefore be reused for a plurality of embodiments of functions in the form of the calculators and bus. The diagnosis is designed before the choice of a hardware architecture (calculators and bus) that can accommodate it, which permits time savings in its design. It will be understood that the term electronic components covers all electronic and electrical components that produce and consume data.

According to a particular characteristic, after the functional diagnosis step, given the choice of an embodiment manifested by a hardware architecture composed of calculators, networks, signal lines and connectors, and the mapping of functions onto the said hardware architecture, the particular values are listed according to the method of claim 1, in order to deduce an operational diagnosis of the resulting electric and electronic architecture.

In this way, the diagnosis for mapping is generated automatically, at least in part.

According to other characteristics, the particular values are classified after mapping of the functions onto the said hardware architecture.

According to other characteristics, the particular values are classified, after mapping of the functions onto the said hardware architecture, among at least one of the following classes:

cut bus, corrupted frame, short circuit applied to a wire, wrong contact applied to a connector of bundles, sensor, actuator or calculator, and execution fault applied to a microcontroller.

In this way, the diagnosis after mapping is generated automatically by categories and, in order to reduce the design cost, the designer may not specify the diagnosis of certain categories, for example because they are more reliable.

We note that, if a single category such as short circuits is separated, it is implicitly possible to diagnose it, since, if a fault does not originate from any of the other categories, the faults of the said category remain the only candidates for explanation of a problem.

According to particular characteristics, given an operational diagnosis for a service, the functional particular values associated with sensors, actuators and functions executing the said service having been listed for at least one data flow between two functions, or between a sensor and a function, or between a function and an actuator, for which no functional particular value is defined for the said flow, if an operational particular value is defined, then a new functional particular value is automatically determined for this flow.

In this way, given the diagnosis of the mapping of a functional architecture, there is deduced a functional diagnosis of the said functional architecture that can be applied to other mappings.

According to particular characteristics, there is envisioned a diagnostic method characterized in that, for each step of claim 1, there are listed not only the particular values but also the undiagnosed feared incidents and the undiagnosable feared incidents in order to construct an analysis of the functional safety of a functional architecture.

In this way, the analysis of functional safety can be achieved, at least partly, before an embodiment comprising calculators and networks has been chosen.

According to particular characteristics, there is envisioned a diagnostic method characterized in that, given the choice of an embodiment manifested by a hardware architecture composed of calculators, networks, signal lines and connectors, and the mapping of functions onto the said hardware architecture, the particular values and feared incidents are listed according to the method of claim 5, in order to deduce an analysis of functional safety of the resulting functional architecture.

In this way, the analysis of functional safety can be generated automatically, at least partly.

The method can include a step of analysis of the feasibility and/or susceptibility to failure of functioning of the said architecture and of the establishment of an output indicating the said feasibility and/or susceptibility to failure.

The present invention also provides a commercial article provided with a computer-readable memory, a program executable by a computer being recorded in the said memory for the diagnosis of functional faults of a functional architecture, characterized in that the said program includes encoding for:

i) determining and listing particular values corresponding to functional faults of sensors and actuators, ii) determining and listing particular values permitting propagation of information relating to these faults across the said functional architecture, iii) forming the functional diagnosis of the said service as a function of the lists obtained from steps (i) and (ii), and iv) recording the said particular values and their propagation on a memory means for a tool provided for validation of the said architecture.

The present invention also provides a data-processing tool programmed for the diagnosis of functional faults of a functional architecture using the steps of the method of the present invention or programmed by using a commercial article of the present invention.

The said architecture can comprise an architecture with which a vehicle can be equipped.

BRIEF DESCRIPTION OF THE DRAWINGS

Other objectives, characteristics and advantages of the present invention will become apparent by way of example on reading of the following description and examining the attached drawing, wherein.

DETAILED DESCRIPTION OF THE PREFERRED EMBODIMENTS

Figure 1:
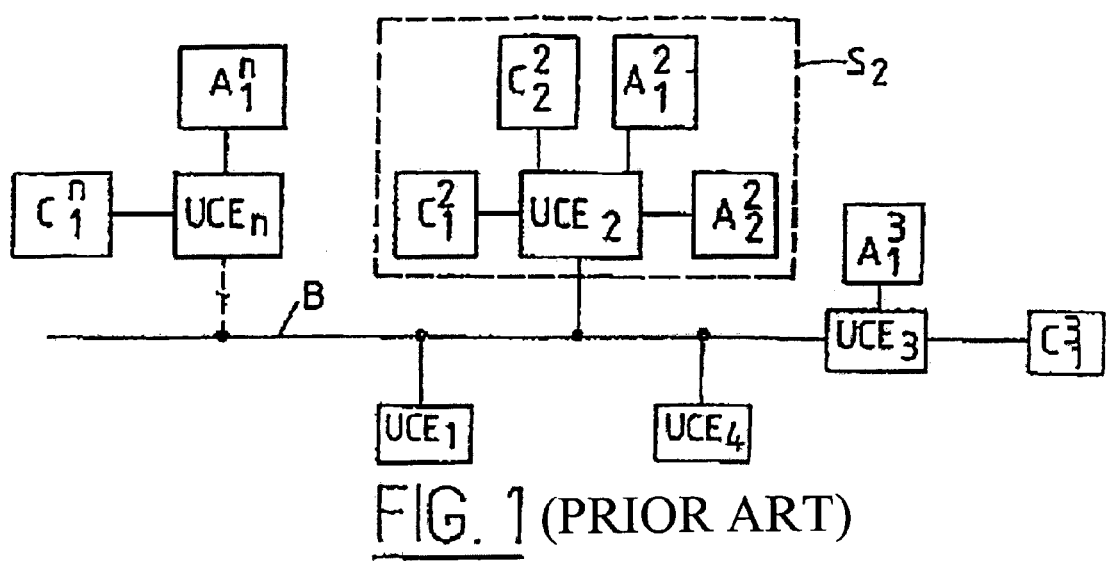
FIG. 1 is a schematic diagram of an assembly of electronic systems that is intended to be endowed with means for diagnosing functional faults according to the present invention, this assembly being described in the preamble of the present description.
Figure 2:
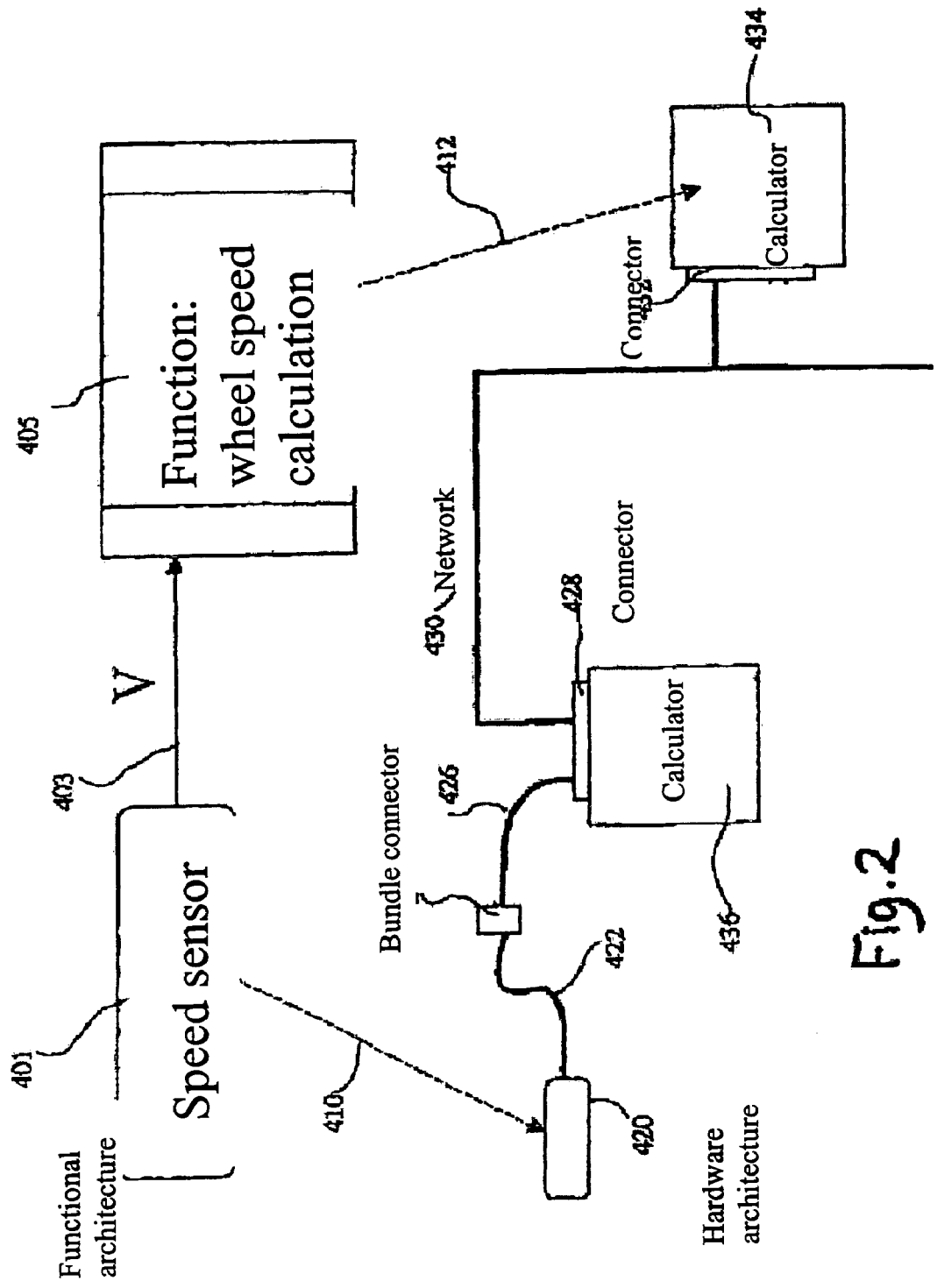
FIG. 2 is a schematic diagram illustrating a type of mapping of a function onto a hardware architecture.

In FIG. 2, "wheel speed calculation" function 405 consumes a raw datum "V" 403 originating from "wheel speed" sensor 401. A diagnosis of datum V can be determined from an information stream originating from "wheel speed" sensor 401 or by filtering "wheel speed calculation" 405 at the input. Let us suppose that this diagnosis is determined by a particular value of "V" 403, such as the particular value "Vpart" of "V".

In FIG. 2, in a particular embodiment, speed sensor 420 is allocated to a calculator 436, and "wheel speed calculation" function 405 is achieved by a process executed on another calculator 434.

The transformation of speed sensor 401 of a functional architecture into speed sensor 420 of a hardware architecture is symbolized by arrow 410. Similarly, the mapping of "wheel speed calculation" function 405 of the functional architecture onto calculator 434 is symbolized by transformation 412. It is noted that the data flow between speed sensor 401 and "wheel speed calculation" function 405 is transformed into a complex pathway of the hardware architecture, which pathway involves:

two calculators 436 and 434 and their respective connectors 428 and 432,
a network 430,
signal lines 422 and 426, and
a bundle connector 424.

A particular value A of "short-circuit" type is associated with the pathway formed by wires 422 and 426 between sensor 420 and calculator 436 to which it is allocated, this value also characterizing a connection fault at the level of at least one of connectors 424 and 428.

A particular value B characterizing the functional state of calculator 436 indicates if relaying of datum "V" on this said calculator 436 can be achieved under good conditions.

A particular value C characterizing the functional state of bus 430 takes into account the absence of transmission of datum "V" on the said bus 430.

According to the invention, particular values A, B, C are considered in addition to the particular value of V for the diagnosis of the data flow between speed sensor 420 and the execution of the "wheel speed calculation" function on calculator 434 onto which it is mapped.

Particular values A, B, C, which can be particular values of "V" or of one or more other data, can be determined automatically from the projection of the data flow on the hardware architecture.

In fact,
the types of faults between a sensor and a calculator or between a calculator and an actuator are faults of connectivity on the signal pathway followed by datum V, and they can be characterized by a particular value on the calculator that receives the signal, provided a function for diagnosing them exists;
the types of faults related to execution of a function on a calculator are diagnosed by the said calculator, one embodiment being the emission of a particular value in the event, for example, of a negative CRC calculation (cyclic redundancy check), or even the systematic emission of a particular value signaling proper functioning of the calculator, the particular value then having the role of a diagnosis of proper functioning and the absence of emission of the said particular value then corresponding to a functional fault of the said calculator; and
the types of faults related to data transmission on a bus are generated from a network management strategy in which each calculator of the network observes the others and interprets an absence of reception as a transient loss of connection, since this can be characterized by a particular value.

Consequently, during the mapping step, the diagnosis of datum V can be enriched by particular values A, B and C, in order to assist in locating a possible fault, in addition to the particular value "Vpart" originating from the sensor, already specified before mapping in the functional architecture.

Reciprocally, given a diagnosis for the embodiment of FIG. 2, if a particular value is defined for any one of elements 420, 422, 424, 426, 428, 436, 430 and 432, for consumption of datum V by the "wheel speed calculation" function, then it is possible to deduce therefrom that at least one particular value V of the data flow must be specified in the functional architecture.

It is noted that the method defined in this way readily applies to a method for analysis of functional safety, the analysis of functional safety performed on a functional architecture then being capable of refinement when the said functional architecture is mapped onto a hardware architecture. The only enrichment lies in the fact that, in an analysis of functional safety, not only are particular values corresponding to faults detectable by the system considered, but also feared incidents not detected by the system are taken into account.

However, this change of viewpoint does not modify the method proposed in the present invention.

In the following there is considered the example of the service permitting access to a vehicle, with more particular emphasis on the functional safety of the service in the "CRASH" situation, or in other words a serious accident detected by a specific sensor, in this case an accelerometer. In such a context, the use case that we will call "CRASH" is: "In an engine running context, if a crash is detected, then the vehicle must undergo emergency unlocking". We wish to ensure that effectively, following a crash, the doors will be unlocked in order that, for example, the rescuers can rapidly remove the passengers from the vehicle. All incidents that may interfere with proper execution of this use case are feared.

Hereinafter, driver denotes a function dedicated to the management of a sensor or actuator; in other words, the function of sensing and shaping a datum originating from an actuator or the function of shaping a setpoint datum and controlling an actuator according to the said setpoint.

To implement the CRASH case, a "crash detected" request is specified. It is implemented by what is known as a "crash detected" function, which senses the value delivered by an accelerometer "A". This value is evaluated in a status bit "a", indicating if a collision is detected. The software driver for sensing the acceleration originating from sensor "A" is the program "P1". When a crash is detected, the system goes to a state that we will call "emergency unlock". In this state, the "unlock doors" function is executed. This execution results in setting a datum "d" to the value "1", read by a software driver P2 (program that controls the lock actuator), which instructs door locks Vi to open.

As an example, the sequencing of operations in the crash situation is then:
the accelerometer has detected a crash value,
driver P1 is executed,
the function that implements the "crash detected" request is evaluated,
crash-detection bit "a" is set to the value "1", which in our example corresponds to validation of the transition to the following state:
the transition to the "emergency unlock" state is achieved,
the elementary operation of unlocking of the doors is activated,
datum "d" is set to the value "1",
software P2 is executed, and
locks Vi are moved to unlocked position.

If we are interested in feared incidents that affect the elementary operation of crash detected valid, we will have, for example:

sensor A is faulty, and

P1 is faulty.

For each of these faults it is supposed that, if they can be diagnosed, the functions may possibly switch to a reduced mode of operation according to a known method. In the method that we are presenting, the idea of switching to reduced mode, well known to the person skilled in the art, is not provided, since the transition at the functional level and at the operational level is equivalent. We will therefore not address this aspect of the analysis of functional safety in our description.

If the elementary operation of crash detected valid is now mapped onto a calculator UCH and if, on the one hand, sensor A is allocated to an "airbag" calculator and, on the other hand, these two calculators are linked by a CAN data bus and datum A is circulating on frame T, then the feared incidents that affect the elementary operation are enriched and become:

sensor A is intrinsically faulty, one of the wires or connectors between sensor A and the airbag calculator is faulty (wire cut, connectivity fault, etc.), one of the other wires and connectors linking sensor A to the other calculators is faulty and is creating a fault of sensor A, the execution of P1 is faulty, the airbag calculator on which P1 is executed is faulty, the CAN bus is cut, frame T is not circulating, subsequent to a fault of the CAN driver on the airbag, frame T is not read correctly by the passenger-compartment calculator, and the passenger-compartment calculator is faulty.

According to another mapping, other incidents corresponding to new calculators and networks and connectivity elements involved are specified.

During the description of the service, it is therefore possible to specify a set of incidents applicable to sensors, actuators, drivers, data and elementary operations. When mapping is performed, the mapping onto calculators connected by networks makes it possible automatically to enrich the description of transitions to reduced modes or of fault propagations by taking into account:

for a sensor or an actuator, the set of defects for each wire and each connector linking this sensor or this actuator to the different calculators and masses, for a driver, a fault of software execution or a fault of the platform onto which it is mapped, for a datum if it is circulating on a network, a cut of the network, for a datum if it is circulating in a frame, a fault of the frame, for a datum if it is circulating on a bridge calculator between two networks, a fault of the calculator, and for an elementary operation, a fault of software execution or a fault of the calculator onto which the elementary operation is mapped.

The set of fault types as well as the components to which these fault types can be applied are stored in a database. Enrichments of incidents subsequent to mapping are thus automatically implemented.

This method can be employed by means of a data-processing tool capable of editing the different objects necessary for design and partial automation of the different steps of the method according to by the invention.

The method can include a step of analysis of the feasibility and/or susceptibility to failure of functioning of the said architecture and of the establishment of an output indicating the said feasibility and/or susceptibility to failure. The architecture can comprise an architecture with which a vehicle, such as a sedan or light truck, can be equipped.

The method of the invention can be programmed on a commercial article provided with a computer-readable memory, such as a CD, DVD or equivalent, or on the hard disk of a computer. Such a program for the method will be executable by a computer and will be recorded on the said memory for execution by the said computer.

The invention claimed is:

1. A method, implemented by a diagnostic device, for diagnosing functional faults of a functional architecture including functions for performing a service in an automobile with an internal combustion engine and associated with sensors and actuators that produce and consume data, said method comprising:

mapping, by said diagnostic device, said functions onto a hardware architecture composed of hardware components;

measuring, by said diagnostic device, a property of said automobile with at least one of said sensors so as to obtain raw data;

creating a first list of particular values based on said raw data and corresponding to functional faults of the sensors and actuators of said automobile;

creating a second list of particular values corresponding to functional states for said hardware components relative to a propagation of signals through said hardware architecture thereby indicating a state of propagation of information relating to said functional faults of said sensors and actuators across the functional architecture;

formulating a functional diagnosis of the service based on the first and second lists of particular values; and recording the particular values and their propagation on a memory device.

2. A diagnostic method according to claim 1, wherein said hardware architecture is an electronic architecture and, after formulating of said functional diagnostic, said method comprises a step of deducing an operational diagnosis of said electronic architecture onto which said functions are mapped, said electronic architecture comprising calculators, networks, signal lines, and connectors.

3. A diagnostic method according to claim 2, wherein creating the lists of said particular values is performed after mapping of the functions onto the electronic architecture.

4. A diagnostic method according to claim 3, wherein the particular values of the second list correspond to at least one of the following:

cut bus;

corrupted frame;

short circuit applied to a wire;

wrong contact applied to a connector of a strand, sensor, actuator or calculator; and execution fault applied to a microcontroller.

5. A method according to claim 2, wherein, given said operational diagnosis for the service, the particular values of the second list comprise functional particular values associated with sensors, actuators, and the method further comprising a step of listing functions executing the service for at least one data flow between two functions, or between a sensor and a function, or between a function and an actuator, for which no functional particular value is defined for the flow, and wherein if an operational particular value is defined, then a new functional particular value is automatically determined for said at least one data flow.

6. A method according to claim 1, further comprising listing undiagnosed feared incidents to construct an analysis of functional safety of the functional architecture.

7. A method according to claim 1, wherein the particular values and feared incidents are listed to deduce an analysis of functional safety of the functional architecture.

8. A diagnostic method according to claim 1, wherein the functional architecture comprises an architecture with which an automobile can be equipped.

9. A diagnostic method according to claim 1, further comprising analyzing feasibility and/or susceptibility to failure of functioning of the functional architecture and analyzing establishment of an output indicating the feasibility and/or susceptibility to failure.

10. A data-processing tool programmed to perform the method for diagnosing functional faults of a functional architecture according to claim 1.

11. A diagnostic method according to claim 1, wherein said particular values of said second list include a value associated with the presence of a connection fault between said hardware components.

12. A diagnostic method according to claim 11, wherein said connection fault is a short-circuit formed by a wire between said hardware components.

13. A diagnostic method according to claim 1, wherein said sensor is a speed sensor and said property measured with said sensor is a wheel speed for said automobile.

14. A diagnostic method according to claim 1, wherein said hardware components include calculators, networks, signal lines, and connectors.

15. A commercial article provided with a computer-readable memory, a program executable by a computer being recorded in the memory for diagnosis of functional faults of a functional architecture including functions for performing a service in an automobile and associated with a sensor, the program including encoding for:

mapping said functions onto a hardware architecture composed of hardware components;

measuring a property of said automobile with said sensor so as to obtain raw data;

determining and listing a first plurality of particular values based on said raw data and corresponding to functional faults of said sensor;

determining and listing a second plurality of particular values corresponding to functional states for said hardware components relative to a propagation of signals through said hardware architecture thereby indicating a state of propagation of information relating to said faults across the functional architecture;

forming a functional diagnosis of the functional architecture based on first and second pluralities of said particular values; and recording the particular values and their propagation on a memory.

16. A data-processing tool comprising the commercial article according to claim 15.

* * * * *